(12) United States Patent
Li

(10) Patent No.: US 9,740,281 B2
(45) Date of Patent: Aug. 22, 2017

(54) HUMAN-MACHINE INTERACTION METHOD AND APPARATUS

(71) Applicant: Huawei Technologies Co., Ltd., Shenzhen, Guangdong (CN)

(72) Inventor: Ying Li, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 14/583,487

(22) Filed: Dec. 26, 2014

(65) Prior Publication Data

US 2015/0109204 A1    Apr. 23, 2015

Related U.S. Application Data

(63) Continuation of application No. PCT/CN2013/073786, filed on Apr. 7, 2013.

(30) Foreign Application Priority Data

Nov. 13, 2012  (CN) .......................... 2012 1 0452461

(51) Int. Cl.
    *G06F 3/01*   (2006.01)
    *G06K 9/00*   (2006.01)

(52) U.S. Cl.
    CPC ............. *G06F 3/013* (2013.01); *G06F 3/011* (2013.01); *G06F 3/012* (2013.01); *G06F 3/017* (2013.01);
    (Continued)

(58) Field of Classification Search
    None
    See application file for complete search history.

(56) References Cited

U.S. PATENT DOCUMENTS 6,762,794 B1 * 7/2004 Ogino .................. G06T 7/0022
                                                      348/262
7,533,988 B2 * 5/2009 Ebisawa ............ G06K 9/00604
                                                      351/205

(Continued)

FOREIGN PATENT DOCUMENTS

CN      101311882 A    11/2008
CN      101441513 A     5/2009
(Continued)

OTHER PUBLICATIONS

Li Tao, "Eye Gazing Direction Inspection Based on Gazing Angle", Computer Technology and Development, vol. 19, No. 8, Aug. 2009, 4 pages.

(Continued)

*Primary Examiner* — Claire X Pappas
*Assistant Examiner* — Christopher Kohlman

(57) ABSTRACT

Embodiments of the present invention disclose a human-machine interaction method and apparatus. The method includes: capturing a line-of-sight direction; determining a change of an angle between a line of sight and a screen, and/or a change of a distance between a user and the screen according to the line-of-sight direction; and performing, according to the change of the angle and/or the change of the distance, a corresponding operation on content displayed on the screen. Corresponding to the foregoing method, the foregoing apparatus includes: a line-of-sight tracking unit, a processing unit, and an executing unit. In the present invention, an action of a user can be determined without depending on gravity sensing, and a corresponding operation can be performed on content displayed on a screen.

16 Claims, 5 Drawing Sheets

(52) U.S. Cl.
CPC ....... *G06K 9/0061* (2013.01); *G06K 9/00604* (2013.01)

(56) References Cited

U.S. PATENT DOCUMENTS

| | | | | |
|---|---|---|---|---|
| 8,739,019 B1* | 5/2014 | Nevins | ................... | G06F 3/013 715/203 |
| 2008/0267600 A1* | 10/2008 | Omi | ................... | G06K 9/00255 396/14 |
| 2010/0189426 A1* | 7/2010 | Bao | ................... | G06F 3/012 396/77 |
| 2011/0148931 A1 | 6/2011 | Kim | | |
| 2011/0228975 A1* | 9/2011 | Hennessey | ............. | A61B 3/113 382/103 |
| 2012/0223884 A1 | 9/2012 | Bi et al. | | |
| 2013/0135196 A1* | 5/2013 | Park | ................... | G06F 3/01 345/156 |
| 2013/0176208 A1* | 7/2013 | Tanaka | ................... | G06F 3/013 345/156 |
| 2013/0265227 A1* | 10/2013 | Julian | ................. | G06F 3/04812 345/157 |
| 2015/0358594 A1* | 12/2015 | Marshall | ................. | G06F 3/013 345/419 |

FOREIGN PATENT DOCUMENTS

| | | |
|---|---|---|
| CN | 201307266 Y | 9/2009 |
| CN | 101807110 A | 8/2010 |
| CN | 101813976 A | 8/2010 |
| CN | 102081503 A | 6/2011 |

OTHER PUBLICATIONS

Chuang Zhang, et al., "A Novel Eye Gaze Tracking Technique Based on Pupil Center", Chinese Journal of Computers, vol. 33, No. 7, Jul. 31, 2010, 35 pages.

* cited by examiner

HUMAN-MACHINE INTERACTION METHOD AND APPARATUS

CROSS-REFERENCE TO RELATED APPLICATIONS

This application is a continuation of International Application No. PCT/CN2013/073786, filed on Apr. 7, 2013, which claims priority to Chinese Patent Application No. 201210452461.3, filed on Nov. 13, 2012, both of which are hereby incorporated by reference in their entireties.

TECHNICAL FIELD

The present invention relates to an operation on displayed content, and in particular, to a human-machine interaction method and apparatus.

BACKGROUND

With the development of electronic technologies and the increase of user requirements, criteria for determining advantages and disadvantages of electronic products are currently not limited to hardware specifications and technical specifications, but focusing on user experience and feelings is key for vendors to gain market. Many existing electronic products such as a mobile phone, a tablet, an MP3, an MP4, and a game machine can perform a corresponding operation according to a user's corresponding action. For example, when the user flips a machine body, a screen is automatically flipped; when the user shakes the machine body, an interface, a song or a video is switched; when the user tilts the machine body, an image on the screen moves accordingly; and in a car racing game, a racecar direction on a screen is controlled by swinging the machine body to the left and right by the user. These electronic products significantly improve the user experience compared with previous electronic products that can only be operated by using a keyboard or a touchscreen.

In the prior art, a method for implementing the foregoing functions is commonly based on a gravity sensing principle, that is, the piezoelectric effect is used to determine a direction by measuring values of component forces of gravity in two orthogonal directions for a sheet of weight (currently, a gravity sensing chip is commonly used inside an electronic product, and the weight and a piezoelectric patch are made into a whole) inside the electronic product, thereby determining an action of a user. A defect of gravity sensing is that a product needs to be used within a sphere of gravity, and these functions are lost after the product is out of the sphere of gravity.

SUMMARY

The present invention provides a human-machine interaction method and apparatus, which can determine an action of a user without depending on gravity sensing and perform a corresponding operation on content displayed on a screen.

A first aspect of the present invention provides a human-machine interaction method, including:
 capturing a line-of-sight direction;
 determining a change of an angle between a line of sight and a screen, and/or a change of a distance between a user and the screen according to the line-of-sight direction; and
 performing, according to the change of the angle and/or the change of the distance, a corresponding operation on content displayed on the screen.

In a first possible implementation manner, the capturing a line-of-sight direction includes:
 extracting a line-of-sight characteristic parameter according to a pupil-corneal reflection method, where the line-of-sight characteristic parameter includes a vector from a pupil center to corneal reflection; and
 calculating a coordinate position of the line-of-sight direction on the screen according to the vector from a pupil center to corneal reflection.

With reference to the first possible implementation manner of the first aspect, in a second possible implementation manner, the line-of-sight characteristic parameter further includes a line-of-sight characteristic vector, and the determining a change of an angle between a line of sight and a screen, and/or a change of a distance between a user and the screen according to the line-of-sight direction includes:
 calculating the distance between the user and the screen according to the line-of-sight characteristic vector; and
 calculating the angle between the line of sight and the screen according to the distance between the user and the screen and the coordinate position.

With reference to the first aspect and the first and the second possible implementation manners of the first aspect, in a third possible implementation manner, the performing, according to the change of the angle, a corresponding operation on content displayed on the screen includes:
 controlling, according to the change of the angle, the content displayed on the screen to move in a vertical direction, horizontal direction or diagonal direction of the screen.

With reference to the first aspect and the first and the second possible implementation manners of the first aspect, in a fourth possible implementation manner, the performing, according to the change of the angle, a corresponding operation on content displayed on the screen includes:
 controlling, according to the change of the angle, the content displayed on the screen to switch to a previous or next page.

With reference to the first aspect and the first and the second possible implementation manners of the first aspect, in a fifth possible implementation manner, the performing, according to the change of the distance, a corresponding operation on content displayed on the screen includes:
 adjusting, according to the change of the distance, a size of the content displayed on the screen.

A second aspect of the present invention provides a human-machine interaction apparatus, including:
 a line-of-sight tracking unit, configured to capture a line-of-sight direction;
 a processing unit, configured to determine a change of an angle between a line of sight and a screen, and/or a change of a distance between a user and the screen according to the line-of-sight direction; and
 an executing unit, configured to perform, according to the change of the angle and/or the change of the distance, a corresponding operation on content displayed on the screen.

In a first possible implementation manner, the line-of-sight tracking unit includes a line-of-sight characteristic parameter extracting module and a coordinate position calculating module, where:
 the line-of-sight characteristic parameter extracting module is configured to extract a line-of-sight characteristic parameter according to a pupil-corneal reflection method, and the line-of-sight characteristic parameter includes a vector from a pupil center to corneal reflection; and the coordinate position calculating module is configured to calculate a coordinate position of the line-of-sight direction on the screen according to the vector from a pupil center to corneal reflection.

With reference to the first possible implementation manner of the second aspect, in a second possible implementation manner, the line-of-sight characteristic parameter further includes a line-of-sight characteristic vector, and the processing unit includes a distance calculating module and an angle calculating module, where:

the distance calculating module is configured to calculate the distance between the user and the screen according to the line-of-sight characteristic vector; and the angle calculating module is configured to calculate the angle between the line of sight and the screen according to the distance between the user and the screen and the coordinate position.

With reference to the second aspect and the first and the second possible implementation manners of the second aspect, in a third possible implementation manner, a specific manner of performing, by the executing unit according to the change of the angle, a corresponding operation on content displayed on the screen is:

the executing unit is configured to control, according to the change of the angle, the content displayed on the screen to move in a vertical direction, horizontal direction or diagonal direction of the screen.

With reference to the second aspect and the first and the second possible implementation manners of the second aspect, in a fourth possible implementation manner, a specific manner of performing, by the executing unit according to the change of the angle, a corresponding operation on content displayed on the screen is:

the executing unit is configured to control, according to the change of the angle, the content displayed on the screen to switch to a previous or next page.

With reference to the second aspect and the first and the second possible implementation manners of the second aspect, in a fifth possible implementation manner, a specific manner of performing, by the executing unit according to the change of the distance, a corresponding operation on content displayed on the screen is:

the executing unit is configured to adjust, according to the change of the distance, a size of the content displayed on the screen.

According to a human-machine interaction method and apparatus provided by the present invention, a corresponding operation is performed, according to a change of an angle between a line of sight of a user and a screen, and a change of a distance between the user and the screen, on content displayed on the screen, which does not depend on gravity sensing. The user can still conveniently perform an operation on the screen, and the operation does not need to be controlled by hands. A human-machine interaction manner is novel and especially suitable for disabled persons to read electronic documents, view pictures, watch videos, and the like.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
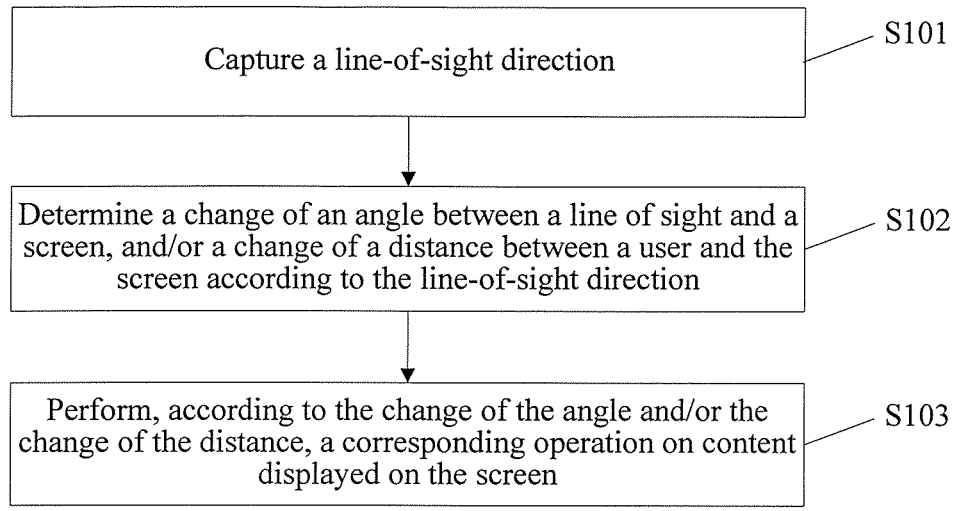
FIG. 1 is a flowchart of a human-machine interaction method according to an embodiment of the present invention.

Referring to FIG. 1, FIG. 1 is a flowchart of a human-machine interaction method according to an embodiment of the present invention. The method includes:

S101: Capture a line-of-sight direction.

Figure 2:
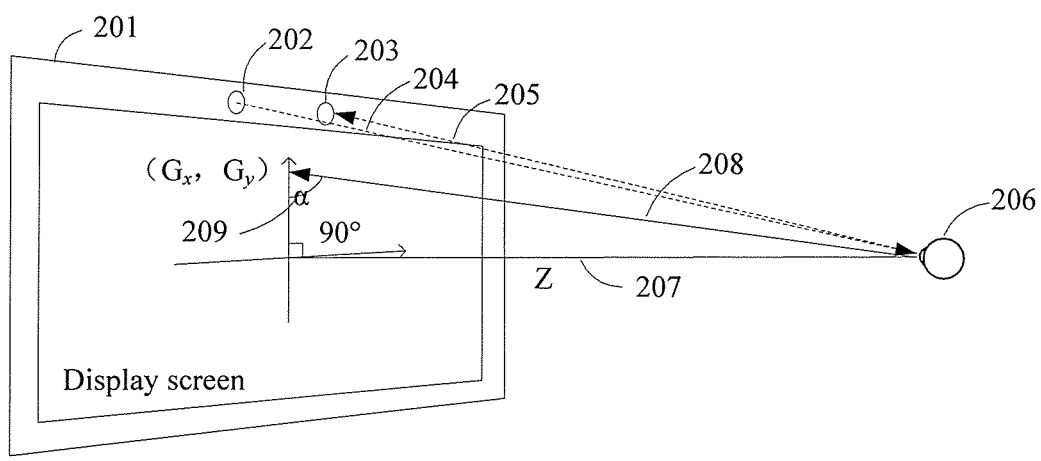
FIG. 2 is a schematic diagram showing line-of-sight tracking.

A line-of-sight tracking technology may be used to capture a line-of-sight direction of an eye of a user. As shown in FIG. 2, a line-of-sight direction is captured by a camera 203 and an infrared light source transmitter 202 that are installed on a display or a machine body. A solution of the line-of-sight tracking technology may use a non-intrusive line-of-sight tracking technology that is based on video oculo graphic (VOG). A basic principle of the non-intrusive line-of-sight tracking technology is to use some eye structures and characteristics of which relative positions remain unchanged when an eyeball rolls as a reference, extract Line of sight/point of regard (LOS/POR) change parameters between changed position characteristics and these unchanged characteristics, and then obtain a line-of-sight direction by using a geometric model or a mapping model. A VOG-based line-of-sight tracking technology is divided into two constituent parts: line-of-sight characteristic parameter extraction and line-of-sight estimation model establishment.

A line-of-sight characteristic parameter is a necessary process and premise for line-of-sight tracking. According to a different line-of-sight tracking method, extracted characteristics may include a vector from a pupil center to corneal reflection, a corneal reflection matrix, an elliptical boundary of an iris, and the like. The VOG-based line-of-sight tracking technology generally uses a pupil-corneal reflection method. When an infrared light source and a camera are coaxial, a pupil is brighter than an iris (bright pupil); and when the infrared light source is separated from the camera, the pupil is darker than the iris (dark pupil). In the line-of-sight tracking method based on the pupil-corneal reflection method, detection is performed on a line-of-sight characteristic by controlling an infrared emission direction of an infrared light source, so as to generate bright pupil and dark pupil phenomena. Bright pupil and dark pupil images are used to extract a pupil characteristic by using an image difference technology, thereby quickly capturing a position of an eye from an entire face image and precisely and accurately segmenting a pupil in an eye image.

A method for capturing a line-of-sight direction may be: controlling an infrared emission direction of an infrared light source or controlling the infrared light source to be bright and dark alternately to generate a video sequence in which bright pupils and dark pupils alternately appear in a discontinuous frame manner, using a difference between adjacent bright pupil and dark pupil images to eliminate impact of a background, and detecting a pupil in a difference image that has undergone thresholding. Specific steps are:

performing subtraction on bright pupil and dark pupil images to obtain a difference image, and filtering the difference image to obtain a pupil area;

detecting an edge of the pupil area, and searching for corneal reflection near an eye area based on grayscale;

locating a corneal reflection center by a method of seeking a centroid, and filtering an edge of a pupil to eliminate impact of the corneal reflection on an edge outline of the pupil; and locating a pupil center by using ellipse fitting to obtain coordinates of the center, and extracting a line-of-sight characteristic vector L.

$$L = \left(\Delta x, \Delta y, \frac{\alpha_{major}}{\alpha_{minor}}, \theta, i_c, j_c\right),$$

where, $(\Delta x, \Delta y)$ is a vector from a pupil center to corneal reflection, where $(\Delta x, \Delta y) = p_{i_p,j_p} - p_{i_c,j_c}$, $(i_p, j_p)$ is a location of the pupil center in the image, $(i_c, j_c)$ is a location of corneal reflection in the image, a ratio of $\alpha_{major}$ to $\alpha_{minor}$ is a ratio of the major axis of a pupil ellipse to the minor axis of the pupil ellipse, and $\theta$ is an angle between the major axis of pupil ellipse and a vertical direction.

A relationship between a screen position concerned by the user in the line-of-sight direction, that is, a coordinate position $(G_x, G_y)$ of the line-of-sight direction on the screen, and a vector $(\Delta x, \Delta y)$ from a pupil center to corneal reflection may be expressed by a complex non-linear mapping function. For example, it is assumed that a non-linear mapping function in a case in which a position of the user's head is fixed may be expressed as follows:

$$G_x = f_x(\Delta x, \Delta y) \approx a_1(\Delta y) + a_2(\Delta y)\Delta x$$

$$a_1(\Delta y) \approx a_3 + a_4 \Delta y$$

$$a_2(\Delta y) \approx a_5 + a_6 \Delta y$$

$$G_y = f_y(\Delta x, \Delta y) \approx b_1(\Delta x) + b_2 \Delta y + b_3 \Delta y^2$$

$$b_1(\Delta x) \approx b_4 + b_5 \Delta x$$

Figure 3:
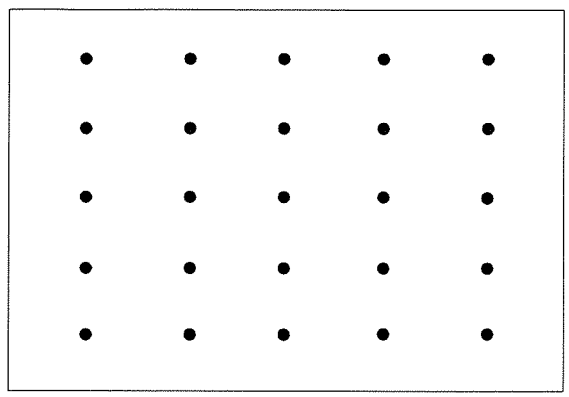
FIG. 3 is a schematic diagram of dividing a screen into 25 dots.

In $(G_x, G_y) = f(\Delta x, \Delta y)$, there are 8 unknowns, and relationships among them may be determined by using more than 4 calibration points. The regression process is performed only once when a model is established. Once 8 unknowns are determined, when different users use a system later, the users may directly use the line-of-sight mapping function without performing the regression process again because individual difference compensation is already implemented in the previous step. For example, 5×5=25 dots are used to calculate the unknowns and the 25 dots are distributed rectangularly on a screen, as shown in FIG. 3. A correction method is to let a testee watch these 25 dots on the screen in sequence. The system records a line-of-sight vector $(\Delta x_i, \Delta y_i)$ when each dot is watched, and coordinates of a position of a corresponding line of sight are $(G_{xi}, G_{yi})$. $(G_x, G_y)$ and $(\Delta x, \Delta y)$ mapping function equations are separately established according to known coordinates of 25 correction target dots. Therefore, a position concerned by another user may be calculated by using a relationship between mapping functions.

A working principle of the line-of-sight tracking technology is shown in FIG. 2: the infrared light source transmitter 202 and the camera 203 are installed on the display 201, the infrared light source transmitter 202 emits an invisible infrared ray 204, the infrared ray is irradiated onto an eye 206 of the user, an infrared signal 205 is reflected back, and the camera collects the infrared signal 205. Then, a processor accurately traces a location of a pupil in combination with "bright pupil" and "dark pupil" phenomena and according to algorithms such as image difference of bright pupils and dark pupils, and filtering, and obtains a line-of-sight direction 208. A coordinate position of the line-of-sight direction 208 on the screen is $(G_x, G_y)$.

S102: Determine a change of an angle between a line of sight and a screen, and/or a change of a distance between a user and the screen according to the line-of-sight direction.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The determining a change of an angle between a line of sight and a screen, and/or a change of a distance between a user and the screen according to the line-of-sight direction includes:

calculating the distance between the user and the screen according to a line-of-sight characteristic vector; and calculating the angle between the line of sight and the screen according to the distance between the user and the screen and a coordinate position.

The distance Z between the user and the screen may be obtained by estimating a line-of-sight characteristic vector L. A set of light-of-sight characteristic vector $L_i$ and distance $Z_i$ may be measured in different positions in advance, a relational model between $L_i$ and $Z_i$ is established, and then a value of Z may be calculated according to an entered L.

A method for calculating the angle between the line of sight and the screen according to the distance between the user and the screen and a coordinate position may be: obtaining $Z/G_y = \tan \alpha$ and $\alpha = \arctan(Z/G_y)$ by using a triangular geometrical relationship shown in FIG. 2.

S103: Perform, according to the change of the angle and/or the change of the distance, a corresponding operation on content displayed on the screen.

A manner of performing, according to the change of the angle, a corresponding operation on the content displayed on the screen may be: controlling, according to the change of the angle, the content displayed on the screen to move in a vertical direction, horizontal direction or diagonal direction of the screen.

Figure 5:
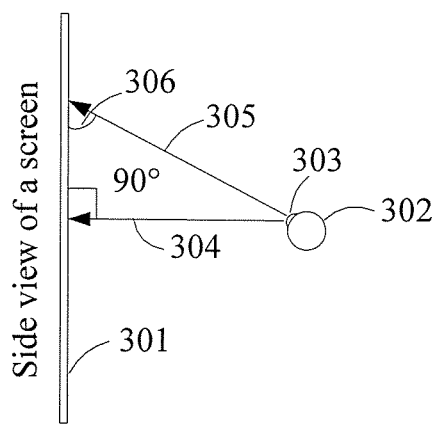
FIG. 5 to FIG. 8 are schematic diagrams of different types of angles between a line of sight and a screen.
Figure 6:
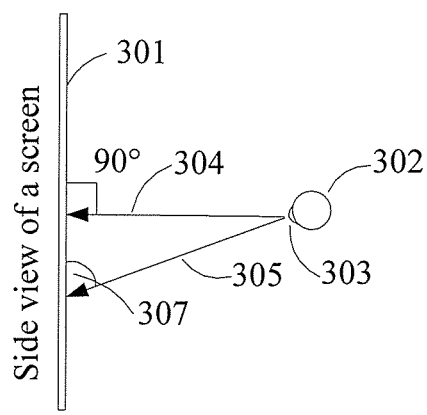
Figure 7:
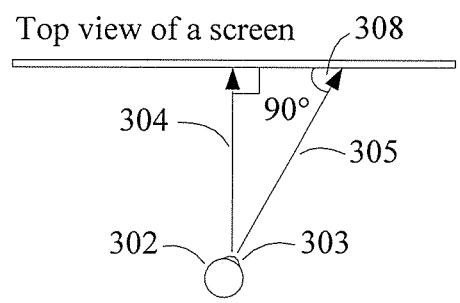
Figure 8:
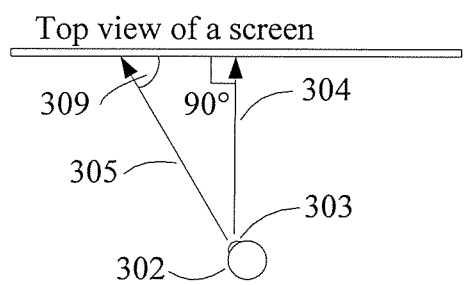

The angle between the line of sight and the screen is a first type of angle, a second type of angle, a third type of angle, or a fourth type of angle. The first type of angle refers to an acute angle, as shown in FIG. 5, which is formed by a line of sight and a vertical direction of a screen when the line of sight is above a screen normal direction on the screen; the second type of angle refers to an acute angle, as shown in FIG. 6, which is formed by a line of sight and a vertical direction of a screen when the line of sight is below a screen normal direction on the screen; the third type of angle refers to an acute angle, as shown in FIG. 7, which is formed by a line of sight and a horizontal direction of a screen when the line of sight is on a right side of the screen normal direction on the screen; and the fourth type of angle refers to an acute angle, as shown in FIG. 8, which is formed by a line of sight and a horizontal direction of a screen when the line of sight is on a left side of the screen normal direction on the screen.

An acute angle 209 formed by a line of sight 208 and a vertical direction on the screen in FIG. 2 is above a line-of-sight normal direction 207 on the screen and belongs to the first type of angle, and a screen normal direction 207 is a line that is perpendicular to a plane on which the screen is located and passes through an eye of a user.

Figure 4:
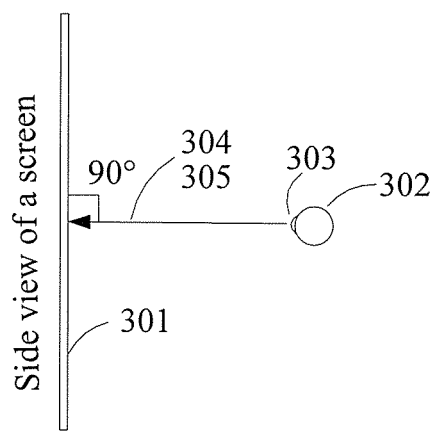
FIG. 4 is a schematic diagram of an angle between a line of sight and a screen when the line of sight and a line-of-sight normal direction overlap.

FIG. 4 is a schematic diagram of an angle in a case in which a line of sight of a user and a line-of-sight normal direction overlap when the user looks squarely at a screen, where 301 is the screen, 304 is the line-of-sight normal direction, 305 is the line of sight, 304 and 305 overlap and are at a 90° angle with the screen, 302 is an eye, 303 is a pupil, and a direction to which the pupil points is a line-of-sight direction. 306 to 309 in FIG. 4 to FIG. 7 are schematic diagrams of a first type of angle to a fourth type of angle respectively.

The controlling, according to the change of the angle, the content displayed on the screen to move in a vertical direction, horizontal direction or diagonal direction of the screen includes that: When the first type of angle becomes smaller, the content displayed on the screen moves upwards in a vertical direction of the screen. For example, when the screen tilts upwards or a line of sight of a user moves upwards, a picture or text page on the screen moves upwards. When the second type of angle becomes smaller, the content displayed on the screen moves downwards in the vertical direction of the screen, or a page is switched in a vertical direction of the screen. For example, when the screen tilts downwards or the line of sight of the user moves downwards, the picture or text page on the screen moves downwards. When the third type of angle becomes smaller, the content displayed on the screen moves rightwards in the horizontal direction of the screen, or pages are switched in the horizontal direction of the screen. For example, when the screen tilts rightwards or the line of sight of the user moves rightwards, the picture or text page on the screen moves rightwards. When the fourth type of angle becomes smaller, the content displayed on the screen moves leftwards in the horizontal direction of the screen, or pages are switched in the horizontal direction of the screen. For example, when the screen tilts leftwards or the line of sight of the user moves leftwards, the picture or text page on the screen moves leftwards.

Angle types in this embodiment may further include an acute angle formed by a line of sight and a diagonal direction of the screen. When the acute angle formed by the line of sight and the diagonal direction of the screen changes, the content displayed on the screen moves in the diagonal direction of the screen, or pages are switched in the diagonal direction, that is, when the screen tilts diagonally or the line of sight of the user moves in the diagonal direction, the content displayed on the screen changes accordingly in the diagonal direction. For a specific method, reference may be made to operation ideas when the first type of angle to the fourth type of angle change, and details are not described herein again.

The manner of performing, according to the change of the angle, a corresponding operation on the content displayed on the screen may further be: controlling, according to the change of the angle, the content displayed on the screen to switch to a previous or next page. Specifically, on the basis that the content displayed on the screen is controlled, according to the change of the angle, to move in the vertical direction, horizontal direction or diagonal direction of the screen, when the content displayed on the screen, such as a picture or text page, moves to a preset threshold position, the content is accordingly switched to a next or previous image, or a previous or next text page.

To make design more user-friendly, in this embodiment, a speed of moving the content displayed on the screen or a speed of switching pages may be associated with a size of the angle between the line of sight and the screen. For example, when the angle is smaller, the speed of moving the content displayed on the screen is higher, or the speed of switching a page is higher.

The performing, according to the change of the distance, a corresponding operation on content displayed on the screen may be adjusting, according to the change of the distance, a size of an image displayed on the screen or a text displayed on the screen. For example, when the user approaches the screen, the image or text displayed on the screen becomes smaller, and when the user moves away from the screen, the image or text displayed on the screen becomes larger, thereby improving perceptual feeling of the user.

In this embodiment, a corresponding operation is performed, according to a change of an angle between a line of sight of a user and the screen, and a change of a distance between the user and the screen, on content displayed on a screen, which does not depend on gravity sensing. The user can still conveniently perform an operation on the screen, and the operation does not need to be controlled by hands. The user may operate and control the screen by moving the line of sight. This method is especially suitable for disabled persons to read electronic documents, view pictures, watch videos, and the like.

Figure 9:
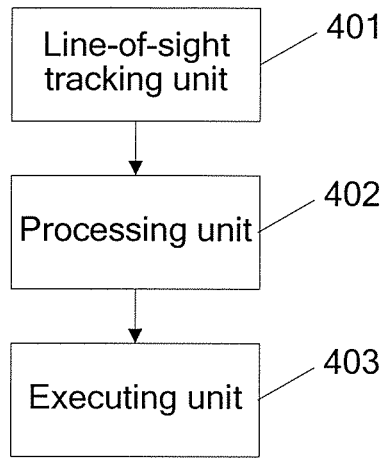
FIG. 9 is a structural diagram of a human-machine interaction apparatus according to an embodiment of the present invention.

Referring to FIG. 9, FIG. 9 is a human-machine interaction apparatus according to an embodiment of the present invention. The apparatus at least includes a line-of-sight tracking unit 401, a processing unit 402, and an executing unit 403, where:

the line-of-sight tracking unit 401 is configured to capture a line-of-sight direction.

For a manner of capturing the line-of-sight direction by the line-of-sight tracking unit 401, refer to the embodiment in FIG. 1, and details are not described herein again.

The processing unit 402 is configured to determine a change of an angle between a line of sight and a screen, and/or a change of a distance between a user and the screen according to the line-of-sight direction.

For a specific implementation manner of determining a change of an angle between a line of sight and a screen, and/or a change of a distance between a user and the screen according to the line-of-sight direction, refer to the embodiment in FIG. 1, and details are not described herein again.

The angle between the line of sight and the screen is a first type of angle, a second type of angle, a third type of angle, a fourth type of angle, or an acute angle formed by the line of sight and a diagonal direction of the screen. For definitions of various angles, refer to the embodiment in FIG. 1, and details are not described herein again.

The executing unit 403 is configured to perform, according to the change of the angle and/or the change of the distance, a corresponding operation on content displayed on the screen.

For a specific operation method, refer to the embodiment in FIG. 1, and details are not described herein again.

To make design more user-friendly, in this embodiment, a speed of moving the content displayed on the screen or a speed of switching a page may be associated with a size of the angle between the line of sight and the screen. For example, when the angle is smaller, the speed of moving the content displayed on the screen is higher, or the speed of switching a page is higher.

Figure 10:
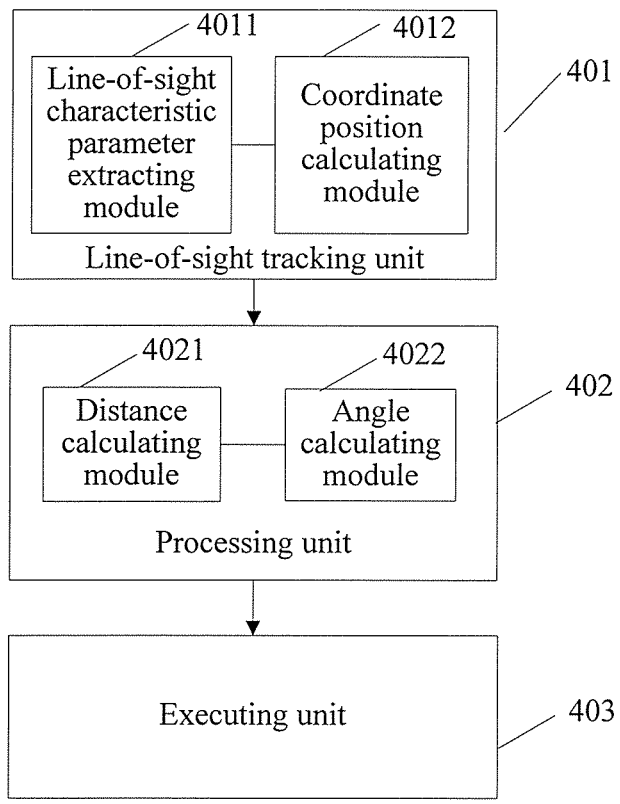
FIG. 10 is a structural diagram of another human-machine interaction apparatus according to an embodiment of the present invention.

Referring to FIG. 10, FIG. 10 is another human-machine interaction apparatus according to an embodiment of the present invention. The apparatus at least includes a line-of-sight tracking unit 401, a processing unit 402, and an executing unit 403. For functions of the line-of-sight tracking unit 401, the processing unit 402, and the executing unit 403, refer to the embodiment in FIG. 9. The line-of-sight tracking unit 401 includes a line-of-sight characteristic parameter extracting module 4011 and a coordinate position calculating module 4012, where:

the line-of-sight characteristic parameter extracting module 4011 is configured to extract, according to a pupil-corneal reflection method, a line-of-sight characteristic parameter, and the line-of-sight characteristic parameter includes a vector from a pupil center to corneal reflection; and the coordinate position calculating module 4012 is configured to calculate a coordinate position of the line-of-sight direction on the screen according to the vector from a pupil center to corneal reflection.

The foregoing line-of-sight characteristic parameter further includes a line-of-sight characteristic vector, and the processing unit 402 includes a distance calculating module 4021 and a angle calculating module 4022, where:

the distance calculating module 4021 is configured to calculate a distance between a user and the screen according to the line-of-sight characteristic vector; and the angle calculating module 4022 is configured to calculate an angle between the line of sight and the screen according to the distance between the user and the screen and a coordinate position.

In this embodiment, a corresponding operation is performed, according to a change of an angle between a line of sight of a user and the screen, and a change of a distance between the user and the screen, on content displayed on a screen, which does not depend on gravity sensing. The user can still conveniently perform an operation on the screen, and the operation does not need to be controlled by hands. The user may operate and control the screen by moving the line of sight. This method is especially suitable for disabled persons to read electronic documents, view pictures, watch videos, and the like.

Figure 11:
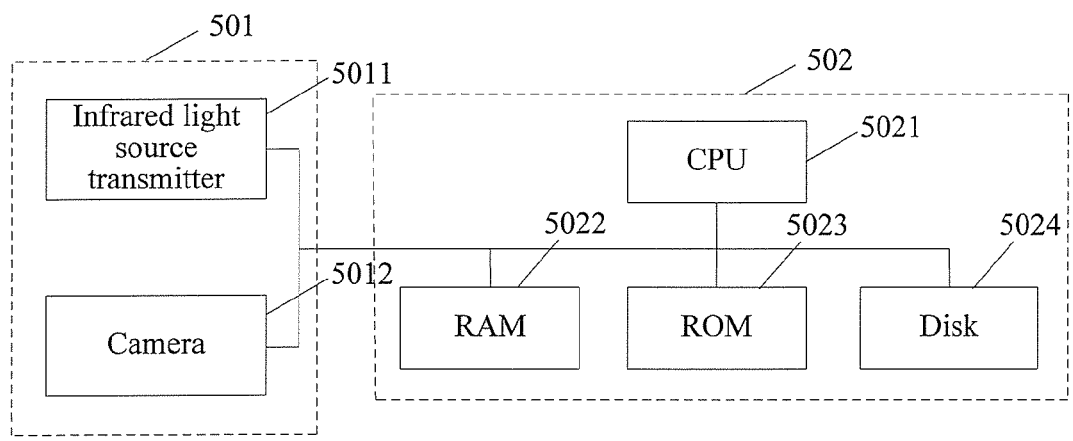
FIG. 11 is a structural diagram of still another human-machine interaction apparatus according to an embodiment of the present invention.

Referring to FIG. 11, FIG. 11 is still another human-machine interaction apparatus according to an embodiment of the present invention. The apparatus at least includes a line-of-sight tracking device 501 and a system device 502, where the line-of-sight tracking device 501 includes a infra-red light source transmitter 5011 and a camera 5012, and the system device 502 includes a CPU 5021, a RAM 5022, a ROM 5023, and a disk 5024.

The CPU 5021 is configured to perform the following steps:

controlling the line-of-sight tracking device 501 to capture a line-of-sight direction;

determining a change of an angle between a line of sight and a screen, and/or a change of a distance between a user and the screen according to the line-of-sight direction; and performing, according to the change of the angle and/or the change of the distance, a corresponding operation on content displayed on the screen.

The CPU 5021 is further configured to perform the following steps:

extracting a line-of-sight characteristic parameter according to a pupil-corneal reflection method, where the line-of-sight characteristic parameter includes a vector from a pupil center to corneal reflection and a line-of-sight characteristic vector; and calculating a coordinate position of the line-of-sight direction on the screen according to the vector from a pupil center to corneal reflection.

The CPU 5021 is further configured to perform the following steps:

calculating the distance between the user and the screen according to the line-of-sight characteristic vector; and calculating the angle between the line of sight and the screen according to the distance between the user and the screen and a coordinate position.

In this embodiment, a corresponding operation is performed, according to a change of an angle between a line of sight of a user and the screen, and a change of a distance between the user and the screen, on content displayed on a screen, which does not depend on gravity sensing. The user can still conveniently perform an operation on the screen, and the operation does not need to be controlled by hands. The user may operate and control the screen by moving the line of sight. This method is especially suitable for disabled persons to read electronic documents, view pictures, watch videos, and the like.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The disclosed are merely exemplary embodiments of the present invention, but are not intended to limit the scope of the present invention. Equivalent variation figured out according to the claims shall fall within the protection scope of the present invention.

What is claimed is:

1. A human-machine interaction method, comprising:
   capturing a line-of-sight direction of an eye of a user in accordance with a generated video sequence in which a bright pupil and a dark pupil alternately appear in a discontinuous frame manner, and using a comparison between adjacent bright pupil images and dark pupil images to eliminate an impact of a background;
   determining a change of an angle between a line of sight and a screen, and/or a change of a distance between the user and the screen according to the line-of-sight direction; and performing, according to the change of the angle and/or the change of the distance, a corresponding operation on content displayed on the screen;

wherein capturing the line-of-sight direction comprises:
  performing subtraction on bright pupil and dark pupil images to obtain a difference image, and filtering the difference image to obtain a pupil area;
  detecting an edge of the pupil area, and searching for corneal reflection near an eye area based on grayscale;
  locating a corneal reflection center by a method of seeking a centroid, and filtering an edge of a pupil to eliminate impact of the corneal reflection on an edge outline of the pupil; and
  locating a pupil center by using ellipse fitting to obtain coordinates of the pupil center; and
  extracting a line-of-sight characteristic vector L, where $$L = \left(\Delta x, \Delta y, \frac{\alpha_{major}}{\alpha_{minor}}, \theta, i_c, j_c\right),$$

where, $(\Delta x, \Delta y)$ is a vector from a pupil center to corneal reflection, where $(\Delta x, \Delta y) = p_{i_p j_p} - p_{i_c j_c}$, $(i_p, j_p)$ is a location of the pupil center in the image, $(i_c, j_c)$ is a location of corneal reflection in the image, a ratio of to $\alpha_{major}$ to $\alpha_{minor}$ is a ratio of the major axis of a pupil ellipse to the minor axis of the pupil ellipse, and $\theta$ is an angle between the major axis of pupil ellipse and a vertical direction.

2. The method according to claim 1, wherein capturing the line-of-sight direction comprises:
  calculating a coordinate position of the line-of-sight direction on the screen according to the vector from the pupil center to corneal reflection.

3. The method according to claim 2, wherein
  determining a change of an angle between a line of sight and a screen, and/or a change of a distance between a user and the screen according to the line-of-sight direction comprises:
    calculating the distance between the user and the screen according to the line-of-sight characteristic vector, and
    calculating the angle between the line of sight and the screen according to the distance between the user and the screen and the coordinate position.

4. The method according to claim 1, wherein performing, according to the change of the angle, a corresponding operation on content displayed on the screen comprises:
  controlling, according to the change of the angle, the content displayed on the screen to move in a vertical direction, a horizontal direction or a diagonal direction of the screen.

5. The method according to claim 4, further comprising controlling a speed of moving the content displayed on the screen in accordance with a size of the angle between the line of sight and the screen.

6. The method according to claim 1, wherein performing, according to the change of the angle, a corresponding operation on content displayed on the screen comprises:
  controlling, according to the change of the angle, the content displayed on the screen to switch to a previous page or a next page.

7. The method according to claim 6, further comprising controlling a speed of switching pages in accordance with a size of the angle between the line of sight and the screen.

8. The method according to claim 1, wherein performing, according to the change of the distance, a corresponding operation on content displayed on the screen comprises:
  adjusting, according to the change of the distance, a size of the content displayed on the screen.

9. A human-machine interaction apparatus, comprising:
  a camera, configured to capture a line-of-sight direction of an eye of a user in accordance with a generated video sequence in which a bright pupil and a dark pupil alternately appear in a discontinuous frame manner, and use a comparison between adjacent bright pupil images and dark pupil images to eliminate an impact of a background; and
  a processor, configured to:
    determine a change of an angle between a line of sight and a screen, and/or a change of a distance between the user and the screen according to the line-of-sight direction; and
    perform, according to the change of the angle and/or the change of the distance, a corresponding operation on content displayed on the screen;
  wherein the camera is further configured to:
    perform subtraction on bright pupil and dark pupil images to obtain a difference image, and filter the difference image to obtain a pupil area;
    detect an edge of the pupil area, and search for corneal reflection near an eye area based on grayscale;
    locate a corneal reflection center by a method of seeking a centroid, and filter an edge of a pupil to eliminate impact of the corneal reflection on an edge outline of the pupil;
    locate a pupil center by using ellipse fitting to obtain coordinates of the pupil center; and
    extract a line-of-sight characteristic vector L, where $$L = \left(\Delta x, \Delta y, \frac{\alpha_{major}}{\alpha_{minor}}, \theta, i_c, j_c\right),$$

where, $(\Delta x, \Delta y)$ is a vector from a pupil center to corneal reflection, where $(\Delta x, \Delta y) = p_{i_p j_p} - p_{i_c j_c}$, $(i_p, j_p)$ is a location of the pupil center in the image, $(i_c, j_c)$ is a location of corneal reflection in the image, a ratio of to $\alpha_{major}$ to $\alpha_{minor}$ is a ratio of the major axis of a pupil ellipse to the minor axis of the pupil ellipse, and $\theta$ is an angle between the major axis of pupil ellipse and a vertical direction.

10. The apparatus according to claim 9, wherein:
  the camera is configured to:
    calculate a coordinate position of the line-of-sight direction on the screen according to the vector from the pupil center to corneal reflection.

11. The apparatus according to claim 10, wherein
  the processor is configured to:
    calculate the distance between the user and the screen according to the line-of-sight characteristic vector; and
    calculate the angle between the line of sight and the screen according to the distance between the user and the screen and the coordinate position.

12. The apparatus according to claim 9, wherein the processor is further configured to control, according to the change of the angle, the content displayed on the screen to move in a vertical direction, a horizontal direction or a diagonal direction of the screen.

13. The apparatus according to claim 12, wherein the processor is further configured to control a speed of moving the content displayed on the screen in accordance with a size of the angle between the line of sight and the screen.

14. The apparatus according to claim 9, wherein the processor is further configured to control, according to the change of the angle, the content displayed on the screen to switch to a previous page or a next page.

15. The apparatus according to claim 14, wherein the processor is further configured to control a speed of switching pages in accordance with a size of the angle between the line of sight and the screen.

16. The apparatus according to claim 9, wherein the processor is further configured to adjust, according to the change of the distance, a size of the content displayed on the screen.

* * * * *